United States Patent
Sung et al.

(10) Patent No.: US 9,034,532 B2
(45) Date of Patent: May 19, 2015

(54) METHOD FOR COLD STARTING FUEL CELL VEHICLE

(75) Inventors: Woo Suk Sung, Gyeonggi-do (KR); Sung Gone Yoon, Gyeonggi-do (KR); Yo In Song, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 973 days.

(21) Appl. No.: 12/619,000

(22) Filed: Nov. 16, 2009

(65) Prior Publication Data
US 2011/0014534 A1     Jan. 20, 2011

(30) Foreign Application Priority Data
Jul. 14, 2009   (KR) .................. 10-2009-0064203

(51) Int. Cl.
*H01M 8/04*   (2006.01)

(52) U.S. Cl.
CPC ...... *H01M 8/04231* (2013.01); *H01M 8/04037* (2013.01); *H01M 8/04253* (2013.01); *H01M 8/04268* (2013.01); *Y02E 60/50* (2013.01)

(58) Field of Classification Search
USPC ......... 429/429, 430, 431, 433, 434, 436, 442, 429/443
See application file for complete search history.

(56) References Cited

U.S. PATENT DOCUMENTS

2005/0170228 A1*   8/2005   Tajiri et al. .............. 429/30
2007/0292724 A1*  12/2007   Gilchrist .................. 429/9

FOREIGN PATENT DOCUMENTS

| JP | 2004-296338 A | 10/2004 | |
| JP | 2007-188826 A | 7/2007 | |
| KR | 10-2007-0088932 | 8/2007 | |
| KR | 10-0748362 | 8/2007 | |
| WO | WO 2008/061550 | * 5/2008 | ............ H01M 8/04 |

* cited by examiner

*Primary Examiner* — Raymond Alejandro
(74) *Attorney, Agent, or Firm* — Mintz Levin Cohn Ferris Glovsky and Popeo, P.C.; Peter F. Corless

(57) ABSTRACT

A method is provided for cold starting a fuel cell vehicle, the method preferably including supplying reactant gases for generating electricity to a fuel cell stack, and simultaneously performing a motoring process for operating the fuel cell vehicle by applying a portion of stack current generated in the fuel cell stack to a drive motor and a heating process for warming up the fuel cell stack by applying the remaining available stack current to a heater for heating coolant. Preferred methods of the invention can provide a more rapid and efficient cold start to the fuel cell vehicle.

13 Claims, 13 Drawing Sheets

METHOD FOR COLD STARTING FUEL CELL VEHICLE

CROSS-REFERENCE TO RELATED APPLICATION

This application claims under 35 U.S.C. §119(a) the benefit of Korean Patent Application Nos. 10-2009-0064203 filed Jul. 14, 2009 and 10-2009-0063209 filed Jul. 10, the entire contents of which are incorporated herein by reference.

BACKGROUND (a) Technical Field

The present disclosure relates, in general, to a method for cold starting a fuel cell vehicle. More particularly, it relates to a method for more efficiently cold starting a fuel cell vehicle which has been left at a low temperature for a long period of time.

(b) Background Art

In general, a typical fuel cell system which is applicable to a hydrogen fuel cell vehicle as an environmentally-friendly vehicle comprises a fuel cell stack for generating electricity by an electrochemical reaction between reactant gases, a fuel processing system (FPS) for supplying hydrogen as a fuel to the fuel cell stack, an air processing system (APS) for supplying oxygen containing air as an oxidant required for the electrochemical reaction in the fuel cell stack, a thermal management system (TMS) for removing reaction heat from the fuel cell stack to the outside of the fuel cell system, controlling operation temperature of the fuel cell stack, and performing water management function, and a system controller for controlling the overall operation of the fuel cell system.

Preferably, the fuel processing system comprises a hydrogen tank, high-pressure and low-pressure regulators, a hydrogen valve, and a hydrogen recirculation system, the air processing system comprises an air blower, an air valve, and a humidifier, and the thermal management system comprises a coolant pump and a radiator.

High-pressure hydrogen supplied from the hydrogen tank of the fuel processing system sequentially passes through the high-pressure and low-pressure regulators and is then supplied to the fuel cell stack at a low pressure. Preferably, a blower is installed in a recirculation line of the hydrogen recirculation system to recirculate unreacted hydrogen exhausted from an anode ("hydrogen electrode") to the anode, thus recycling the hydrogen.

One consideration of the fuel cell vehicle having the above-described fuel cell system is to ensure cold startability.

In present fuel cell systems, when a load is applied to a fuel cell, which has been exposed to sub-zero temperatures for a long time (cold soaking), during initial start-up, water produced in a cathode ("air electrode") by the electrochemical reaction freezes by cold air of the fuel cell stack itself and air at a temperature below the freezing point supplied to the cathode, thus blocking various flow fields and a gas diffusion layer of the fuel cell stack and, at the same time, cutting off the air supply to a cathode catalyst layer. As a result, the voltage of the fuel cell stack is not maintained suitably constant, which makes it difficult to ensure the cold startability.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for cold staring a fuel cell vehicle by simultaneously performing a heating process for warming up a fuel cell stack and a motoring process for operating the fuel cell vehicle during cold start, thus significantly reducing the time required to cold start the fuel cell vehicle.

Accordingly, the present invention includes a method for cold starting a fuel cell vehicle, the method comprising supplying reactant gases for generating electricity to a fuel cell stack and performing a motoring process for operating the fuel cell vehicle and a heating process.

In one embodiment, the motoring process for operating the fuel cell vehicle is performed by applying a portion of stack current generated in the fuel cell stack to a drive motor.

In another embodiment, the heating process for warming up the fuel cell stack is performed by applying the remaining available stack current to a heater for heating coolant.

In still another embodiment, the motoring process and the heating process are performed simultaneously.

In one aspect, the present invention provides a method for cold starting a fuel cell vehicle, the method including supplying reactant gases for generating electricity to a fuel cell stack, and simultaneously performing a motoring process for operating the fuel cell vehicle by applying a portion of stack current generated in the fuel cell stack to a drive motor and a heating process for warming up the fuel cell stack by applying the remaining available stack current to a heater for heating coolant.

In one embodiment, when distributing the stack current to simultaneously perform the motoring and heating processes, the stack current applied to the heater is smaller than that applied to the motor.

In another embodiment, the stack current is applied only to a predetermined coil heating element among a plurality of coil heating elements which constitute the heater such that only the coil heating element which receives the stack current is operated to heat the coolant.

In another further embodiment, a constant stack current is distributed to the heater to perform the heating process during start-up of the vehicle.

In still another embodiment, while the fuel cell is turned off, a valve of a fuel cell system is intermittently heated by a heater receiving electric power from a battery mounted on the fuel cell vehicle and a thermoswitch installed on a battery power supply circuit connected to the heater and automatically opening and closing the battery power supply circuit according to ambient temperature, thus preventing the valve from freezing before the cold start.

In still another embodiment, the thermoswitch is a bimetal switch equipped with a bimetal operated to automatically open and close the battery power supply circuit according to ambient temperature.

In another further embodiment, battery power supplied to the heater is cut off by a controller of an element for preventing battery over-discharge, which turns off the switch of the battery power supply circuit when the battery voltage detected by a voltage detector of the element for preventing battery over-discharge is less than a reference value.

In another related embodiment, the valve of the fuel cell system is a valve in a passage through which humidified air of an air processing system passes, a hydrogen purge valve installed at a hydrogen outlet of the fuel cell stack, or a hydrogen recirculation valve.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
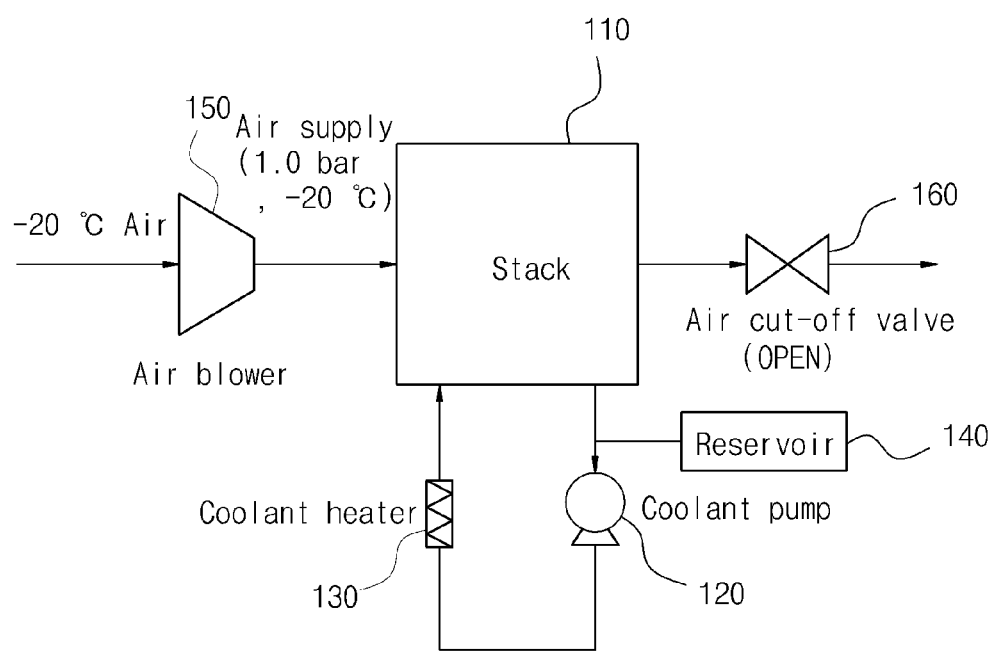
FIG. 1 is a schematic diagram illustrating a cold starting apparatus in an exemplary conventional fuel cell system.

Reference numerals set forth in the Drawings include reference to the following elements as further discussed below:

| | |
|---|---|
| 110: fuel cell stack | 120: pump for circulating coolant |
| 130: heater | 131, 132, & 133: coil heating elements |
| 140: reservoir | 150: air blower |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a method for cold starting a fuel cell vehicle, the method comprising supplying reactant gases for generating electricity to a fuel cell stack and performing a motoring process for operating the fuel cell vehicle and a heating process.

In one embodiment, the motoring process for operating the fuel cell vehicle is performed by applying a portion of stack current generated in the fuel cell stack to a drive motor.

In another embodiment, the heating process for warming up the fuel cell stack is performed by applying the remaining available stack current to a heater for heating coolant.

In still another embodiment, the motoring process and the heating process are performed simultaneously.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

One of the existing methods for ensuring the cold startability of the fuel cell stack is to rapidly thaw the inside of the fuel cell stack by heating coolant circulating through the fuel cell stack using a heater. Another method is to raise the temperature of the fuel cell stack by heating the air supplied to the fuel cell stack using a heater disposed on a line of the air processing system.

As shown in FIG. 1, in order to implement the method for thawing the fuel cell stack using the heater, a pump 120 for circulating coolant, a heater 130 for raising the temperature of coolant, and a reservoir 140 for replenishing water and removing bubbles are suitably installed in a thermal management system connected to a fuel cell stack 110.

Therefore, during start-up of the fuel cell vehicle, electrical energy generated by the electrochemical reaction between hydrogen at the anode and oxygen at the cathode is consumed to generate heat energy by the heater and, at the same time, coolant receiving the heat energy rapidly raises the temperature of the fuel cell stack, thus making it possible that the fuel cell stack suitably operates above a predetermined temperature.

According to the method for raising the temperature of the fuel cell stack, the air is heated by an air heater (not shown) mounted on an air supply line including an air blower 150 and then supplied to the fuel cell stack. Therefore, the water generated in the fuel cell stack and the coolant can be thawed by the heated air, thus making it possible that the fuel cell stack operates above a predetermined temperature.

Conventionally, the vehicle is operated (motoring process) after raising the temperature of the fuel cell stack to an appropriate level (heating process). However, since it takes more than several minutes to raise the temperature of the fuel cell stack by operating the heater, it takes a lot of time to operate the vehicle by the cold start process.

The conventional cold start process is described in more detail below. The cold start process performed until the vehicle is operated may be divided into two stages. The first stage is a heating process for thawing balance of plant (BOP) valves provided in the fuel cell system, and the second stage is a motoring process for warming up the fuel cell stack by raising the temperature of the fuel cell stack to an appropriate level using coolant. Especially, during the motoring process, a large amount of time is spent warming up the fuel cell stack.

Accordingly, the motoring process for operating the vehicle by operating a drive motor is performed after the heating process for warming up the fuel cell stack by heating coolant circulating through the fuel cell stack using a heater. However, if the time required to warm up the fuel cell stack increases, the total time required to perform the cold start process also increases.

Accordingly, the heating process and the motoring process are sequentially performed to cold start the fuel cell vehicle is to prevent electrodes from being suitably deteriorated by reverse voltage generated in an end cell (stacked on the outermost layer of the fuel cell stack). Conventionally, the electrical energy generated in the fuel cell stack is sequentially supplied to the coolant heater and the drive motor to perform the motoring process after completion of the heating process for warming up the fuel cell stack without examining the cause of the end cell reverse voltage and the occurrence of deterioration of the electrodes due to the end cell reverse voltage.

In the heating and motoring processes, the heater and the drive motor are driven by the electrical energy generated in the fuel cell stack, i.e., stack current. To warm up the fuel cell stack, a stack current (less than 50 A or 60 A, for example) is supplied to the heater to raise the temperature of coolant and, if the temperature of air at an outlet of the fuel cell stack reaches a predetermined level (10° C., for example), the stack warm up-process (heating process) is completed.

Upon completion of the stack warm-up process for several minutes, a stack current (more than about 100 A) is supplied to the drive motor to operate the vehicle (motoring process).

Figure 2:
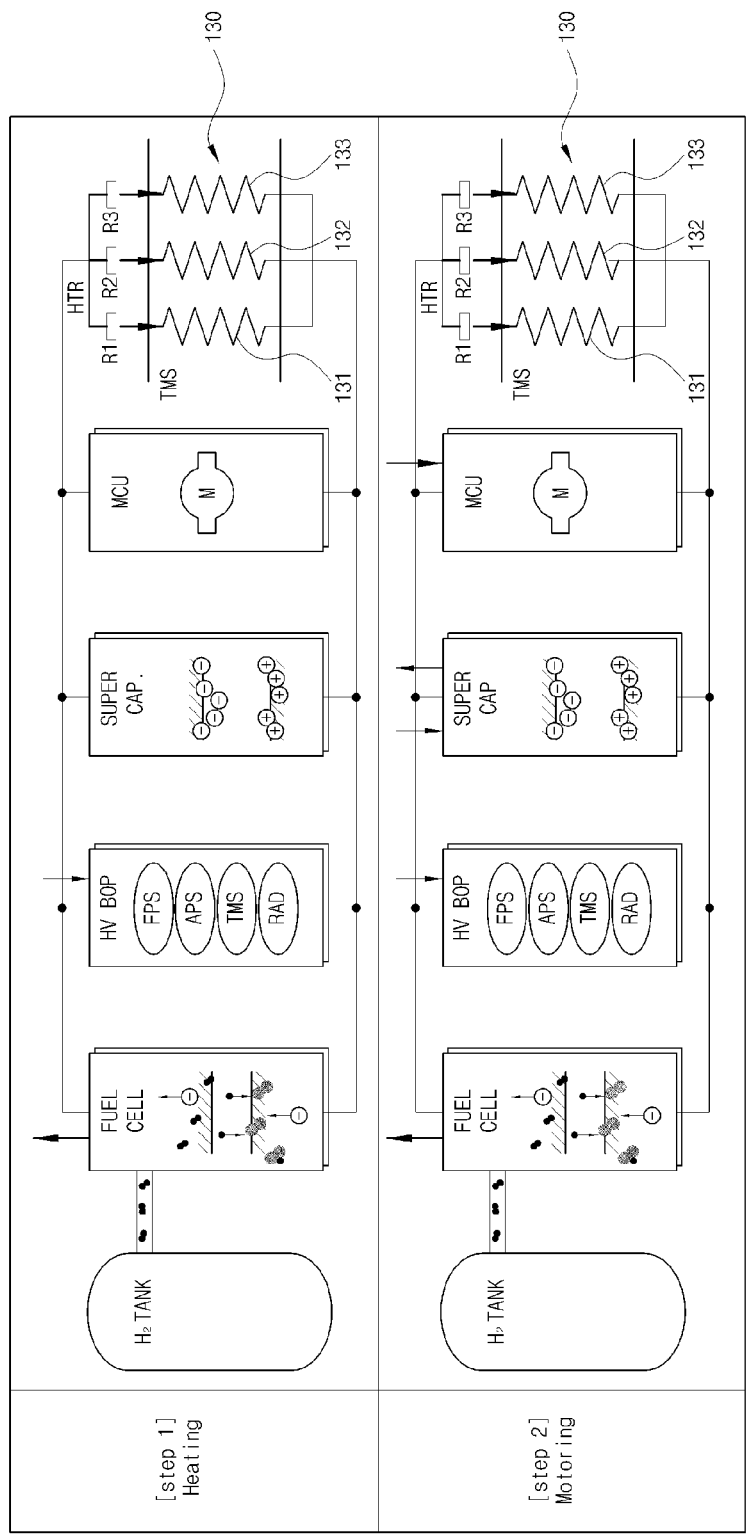
FIG. 2 is a diagram illustrating an exemplary conventional method for cold starting a fuel cell vehicle.

FIG. 2 is a diagram illustrating a conventional method for cold starting a fuel cell vehicle. Referring to FIG. 2, in a heating process of Step 1, reactant gases such as hydrogen as a fuel and air as an oxidant are supplied to the fuel cell stack, and electric power generated in the fuel cell stack (stack current) is supplied to coil heating elements 131, 132, and 133 of the heater 130 to heat coolant, thus warming up the fuel cell stack.

Hydrogen and air as the reactant gases are sequentially supplied to the fuel cell stack after heating and thawing the BOP valves exposed to wet conditions and determining whether the BOP valves are thawed. Subsequently, electric power of an auxiliary battery mounted on the vehicle is supplied to BOP components (after boosting the voltage in the case of high-voltage components) such as BOP valves (including a purge valve at a hydrogen outlet), the air blower of the air processing system, and the coolant pump of the thermal management system, thus operating the BOP components.

In a motoring process of Step 2, a supercapacitor as an auxiliary power source is charged and, at the same time, a stack current is applied to the drive motor through a motor control unit including an inverter (MCU) to operate the drive motor, thus operating the vehicle.

As such, since the heating and motoring processes are sequentially performed in such a manner that the heating process for warming up the fuel cell stack by heating the coolant using the stack current is first completed and then the motoring process for operating the vehicle by operating the drive motor is performed, the total time (more than about three minutes) required to operate the vehicle increases.

The present invention aims at simultaneously performing a heating process for warming up a fuel cell stack and a motoring process for operating a fuel cell vehicle during cold start by appropriately distributing stack power in the fuel cell vehicle, thus considerably reducing the total time required to cold start the fuel cell vehicle.

In order to simultaneously perform the heating and motoring processes, a stack current generated during cold start is preferably applied to a drive motor through a motor control unit (MCU) including an inverter to suitably perform the motoring process and, at the same time, the remaining available stack current is suitably applied to a heater for heating coolant to perform the heating process.

Conventionally, when the stack warm-up (heating) process and the operating (motoring) process are suitably performed at sub-zero temperatures, the motoring process is performed after the heating process for warming up the fuel cell stack is completed, thus preventing electrodes from being deteriorated by end cell reverse voltage.

Accordingly, the present invention addresses the cause of the end cell reverse voltage at sub-zero temperatures and whether it is possible to perform the cold start during the generation of the end cell reverse voltage. The present invention describes that it is possible to simultaneously perform the heating and motoring processes of the present invention even when the end cell reverse voltage is generated by lack of air due to ice blocking and hydrogen pumping at the cathode (air electrode).

The present invention addresses, inpart, the cause of the end cell reverse voltage and whether or not the electrodes are deteriorated by the end cell reverse voltage. Accordingly, a probe for measuring the end cell voltage and a probe for measuring the internal temperature of the fuel cell stack were suitably mounted on an actual vehicle, the fuel cell stack was left at −20° C. for 24 hours (cold soaking), and then it was determined whether the electrodes were deteriorated by the generation of the end cell reverse voltage.

Figure 3:
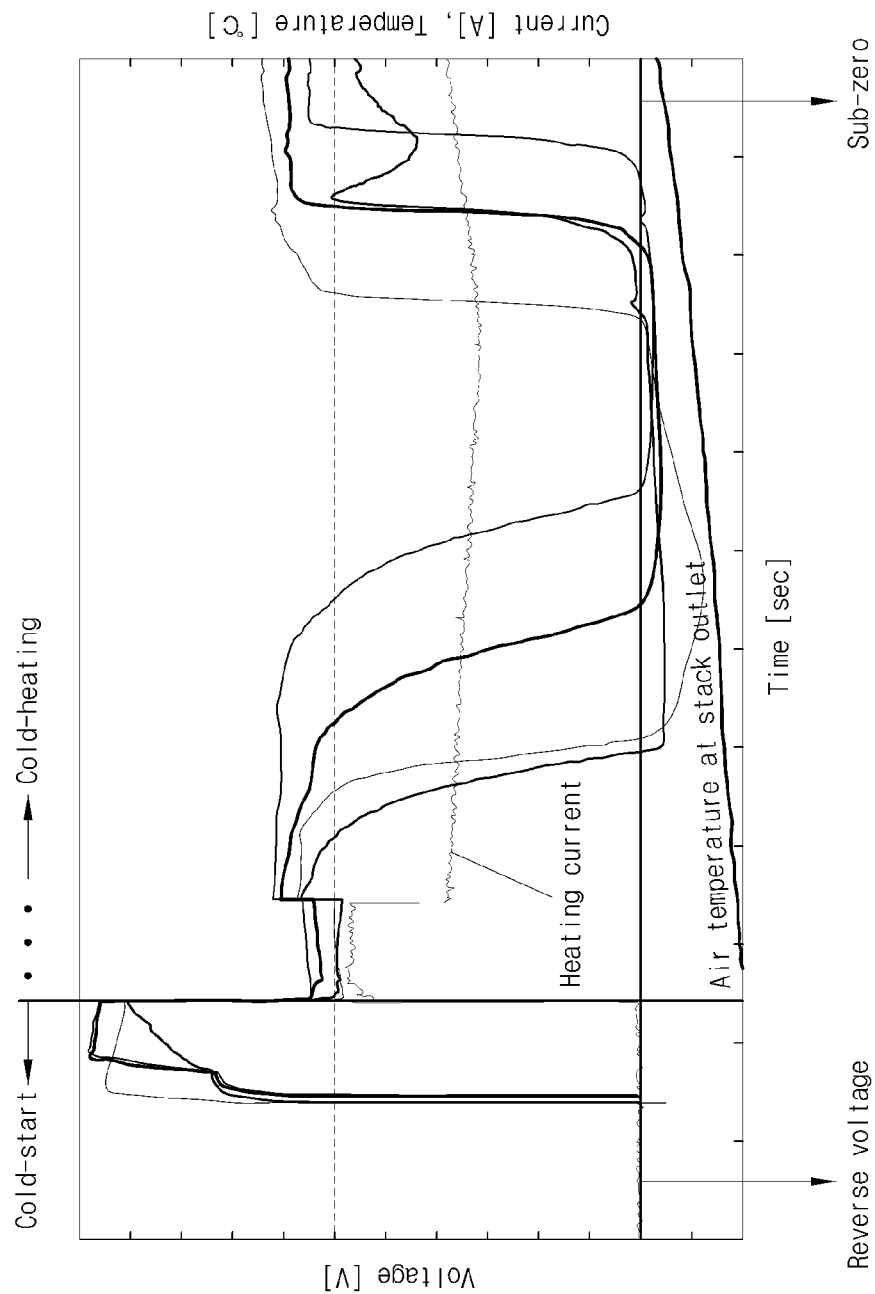
FIG. 3 is a diagram showing a change in end cell reverse voltage due to lack of air on a cathode electrode surface in a fuel cell stack.

FIG. 3 is a diagram showing a change in end cell reverse voltage due to lack of air on a cathode electrode surface in the fuel cell stack. As shown in FIG. 3, it was suitably determined that the end cell reverse voltage was generated by lack of air due to the hydrogen pumping at the cathode and a constant voltage was suitably maintained for several seconds to several minutes, and thus it could be seen that it is not likely that the electrode at the cathode would be deteriorated.

Accordingly, although water produced at the cathode of the fuel cell stack freezes at a temperature below the freezing point during cold start of the fuel cell vehicle, suitably blocks flow fields and a gas diffusion layer of the fuel cell stack, and suitably cuts off the air supply to a cathode catalyst layer (electrode surface), the end cell reverse voltage generated by lack of air due to the ice blocking has no relation to the deterioration of electrodes. As a result, it could be seen that it is possible to simultaneously perform the heating process for warming up the fuel cell stack and the motoring process for operating the vehicle. Accordingly, even though the end cell reverse voltage is suitably generated by the lack of air at the cathode, it is possible to suitably simultaneously perform the heating and motoring processes without causing deterioration of the electrodes. Moreover, in the case of the cathode, a minimum cell voltage limit logic for preventing the reverse voltage during low-temperature heating is not required and can be suitably eliminated.

Figure 4:
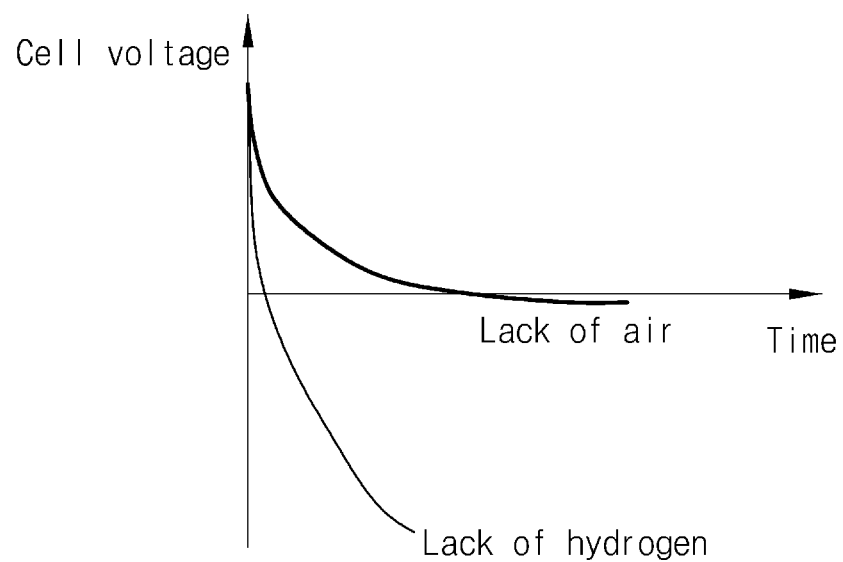
FIG. 4 is a schematic diagram showing the generation of end cell reverse voltage due to lack of hydrogen at an anode and lack of air at a cathode in a fuel cell stack.

In certain preferred embodiments, in the event of lack of hydrogen due to hydrogen blocking at the anode, the end cell reverse voltage is very rapidly generated compared to that generated by the lack of air at the cathode as shown in FIG. 4, and thus the electrode at the anode may be suitably deteriorated due to the end cell reverse voltage.

In other preferred embodiment, however, since the lack of hydrogen due to the freezing of water at sub-zero temperatures does not occur in the anode during the cold start, the electrode at the cathode would not be suitably deteriorated due to the lack of air and it is thus possible to simultaneously perform the heating and motoring processes by appropriately distributing the stack power for the cold start process.

Figure 5:
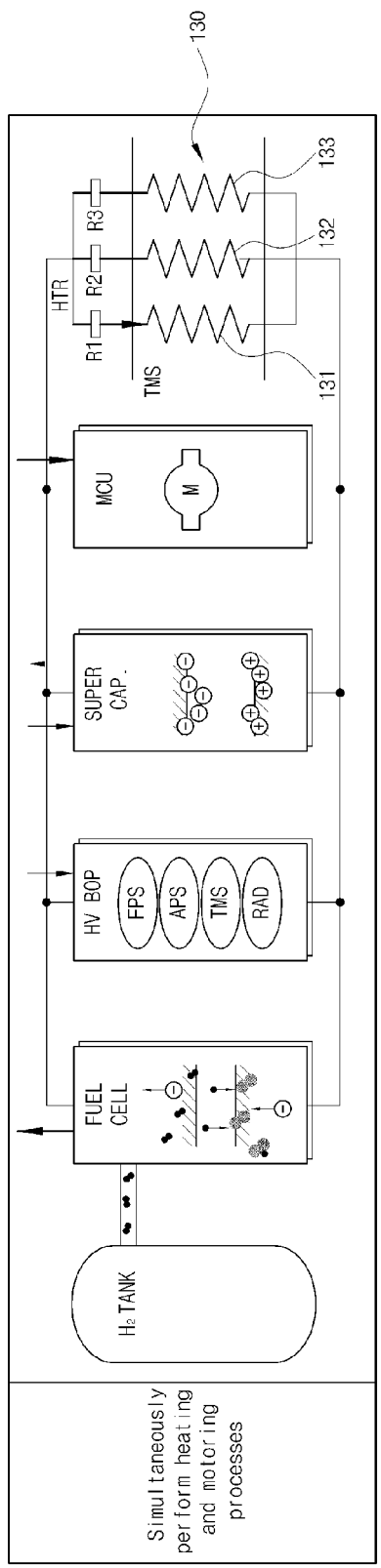
FIG. 5 is a diagram showing the flow of stack power during cold start of a fuel cell vehicle in accordance with the present invention.

According to further preferred embodiments and as shown in FIG. 5, FIG. 5 is a diagram showing the flow of stack power during cold start of the fuel cell vehicle in accordance with the present invention, which illustrates that the heating process for warming up the fuel cell stack and the motoring process for operating the vehicle can be simultaneously performed by suitably distributing the stack power.

In one preferred embodiment, first, reactant gases such as hydrogen as a fuel and air as an oxidant are supplied to the fuel cell stack for the cold start process. At this time, the electric power generated in the fuel cell stack is charged in the supercapacitor, and a portion of the stack current is preferably applied to the drive motor M through the MCU (inverter), thus performing the motoring process for operating the vehicle by the operation of the drive motor.

Preferably, simultaneously with the motoring process, the heating process for warming up the fuel cell stack is suitably performed by applying an available constant current from the stack current to coil heating elements 131, 132, and 133 of the heater 130 to heat coolant by the operation of the heater 130.

Preferably, in further embodiments, the heater 130 is a coolant heater which is generally used in the fuel cell system to raise the temperature of the fuel cell stack by heating coolant circulating through the fuel cell stack and includes the plurality of coil heating elements (resistance elements) 131, 132, and 133 installed in a flow field through which the coolant passes. Further, when the stack current is applied to the coil heating elements, the coil heating elements heat the coolant passing therethrough.

Accordingly, since the available stack current is suitably distributed to the heater 130 in the heating process simultaneously with the motoring process, it is preferred in certain embodiments that a current smaller than the motoring current be distributed as the heating current.

Preferably, in the heating process simultaneously performed with the motoring process during the cold start, the stack current (heating current) distributed to the heater 130 may be applied only to a predetermined coil heating element among the plurality of coil heating elements 131, 132, and 133 such that only the corresponding coil heating element 131 receiving the stack current can be suitably operated.

In certain embodiments, for example, a constant stack current is preferably applied to only one coil heating elements 131 among the three coil heating elements 131, 132, and 133 such that the coolant can be heated by the heating operation of the one coil heating element 131.

According to further exemplary embodiments, in order to apply the stack current only to a specific coil heating element among the plurality of coil heating elements 131, 132, and 133, a fuel cell system controller may selectively turn on relay P1 of the coil heating element 131, to which the stack current (heating current) is applied, among relays P1, P2, and P3 installed at current terminals of the coil heating elements 131, 132, and 133.

Preferably, since the available stack current, which can be applied to the heater, increases during stoppage of the vehicle after the vehicle is operated, it is possible to increase the heating current applied to the heater. In this case, the heating current applied to the coil heating element may increase or the number of coil heating elements to which the heating current is applied may increase (e.g., two coil heating elements can be operated).

According to preferred embodiments of the invention, the above-described heating process for warming up the fuel cell stack, i.e., the heating process for heating the coolant by applying the stack current to the heater is preferably performed until the temperature of air at an outlet of the fuel cell stack reaches a predetermined level (e.g., 10° C.). Preferably, when the temperature of air at the outlet of the fuel cell stack reaches the predetermined level, the heating process is suitably terminated by cutting off the stack current applied to the coil heating element(s) of the heater.

Figure 6:
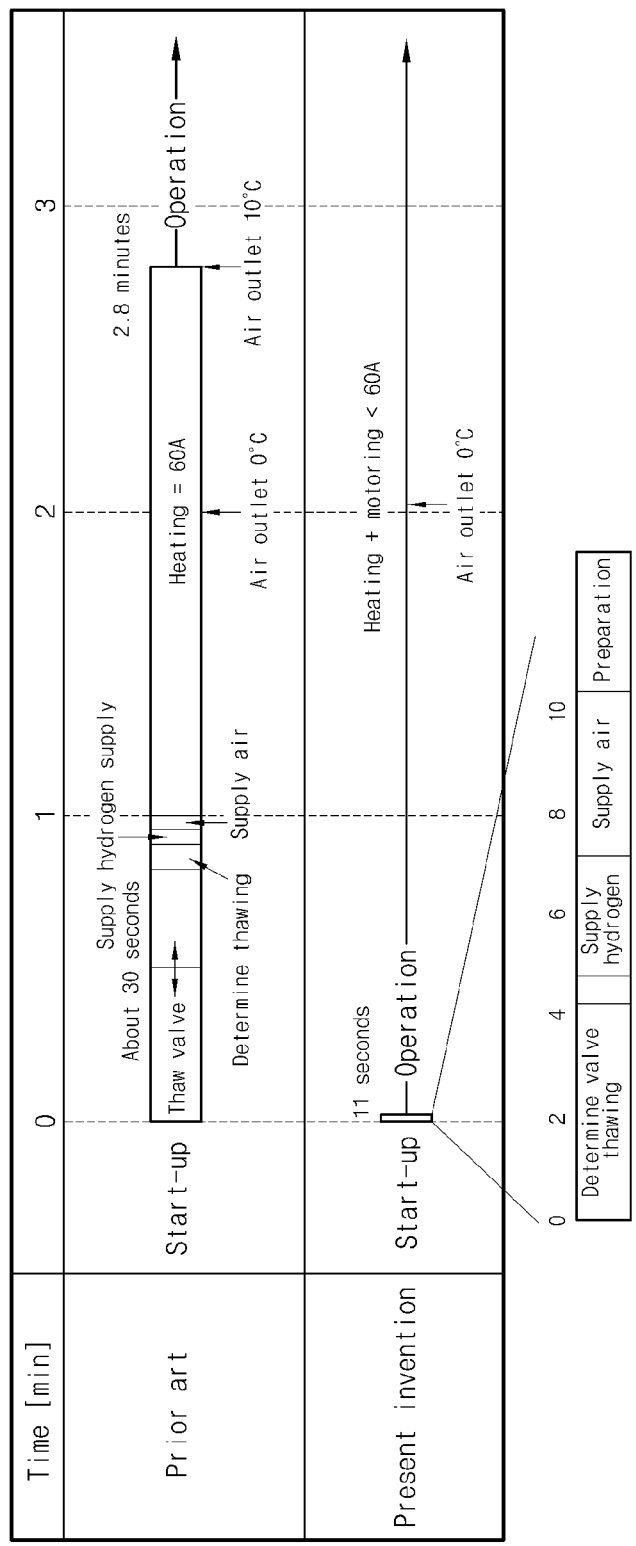
FIG. 6 is a diagram comparing a method for cold starting a fuel cell vehicle in accordance with preferred embodiments of the present invention with a conventional method.

According to other preferred embodiments of the invention and as shown in FIG. 6, FIG. 6 is a diagram comparing the method for cold starting the fuel cell vehicle in accordance with the present invention with a conventional method. In the conventional method, the heating process for warming up the fuel cell stack by thawing the BOP valves, determining whether the BOP valves are thawed, supplying hydrogen and air, and applying the stack current to the heater is first performed, and the motoring process for operating the vehicle by applying the stack current to the drive motor is then performed.

The process for determining whether the BOP valves are thawed may be suitably performed in such a manner that the fuel cell system controller determines detection values of temperature sensors installed in the respective BOP valves.

On the contrary, in the present invention, since the heating and motoring processes are preferably simultaneously performed by appropriately distributing the electric power (stack current) generated in the fuel cell stack to the heater and the drive motor after supplying the reactant gases such as hydrogen and air to the fuel cell stack, it is possible to considerably reduce the cold start time and more efficiently cold start the fuel cell vehicle.

Preferably, although it is necessary to thaw the valves including a hydrogen purge valve, a hydrogen recirculation valve, and valves in flow fields through which reactant gases pass, it is possible to suitably eliminate the heating time (for warming up the fuel cell stack), which is conventionally required prior to the operation process, besides the time required to thaw the valves (e.g., 30 seconds), and thus it is possible to considerably reduce the total time required to cold start the fuel cell vehicle.

In a preferred embodiment, a valve heater (e.g., PTC heater driven by electric power of an auxiliary battery) in which a thermoswitch (e.g., bimetal switch) is suitably applied to the valves including the hydrogen purge valve, the hydrogen recirculation valve, and the valves of the gas flow fields which are exposed to wet conditions during operation of the fuel cell stack, is preferably provided such that the fuel cell system controller determines only whether the valves are thawed, in the case where the valves are prevented from freezing while the fuel cell is turned off and left at sub-zero temperatures for a long time before the cold start, and then immediately opens the valves. Accordingly, it is possible to simultaneously perform the heating and motoring processes in accordance with the present invention, thus considerably reducing the time required to operate the fuel cell vehicle.

The method for preventing the valves of the fuel cell system from freezing by employing the thermoswitch while the fuel cell is turned off before the cold start is described herein.

Figure 7:
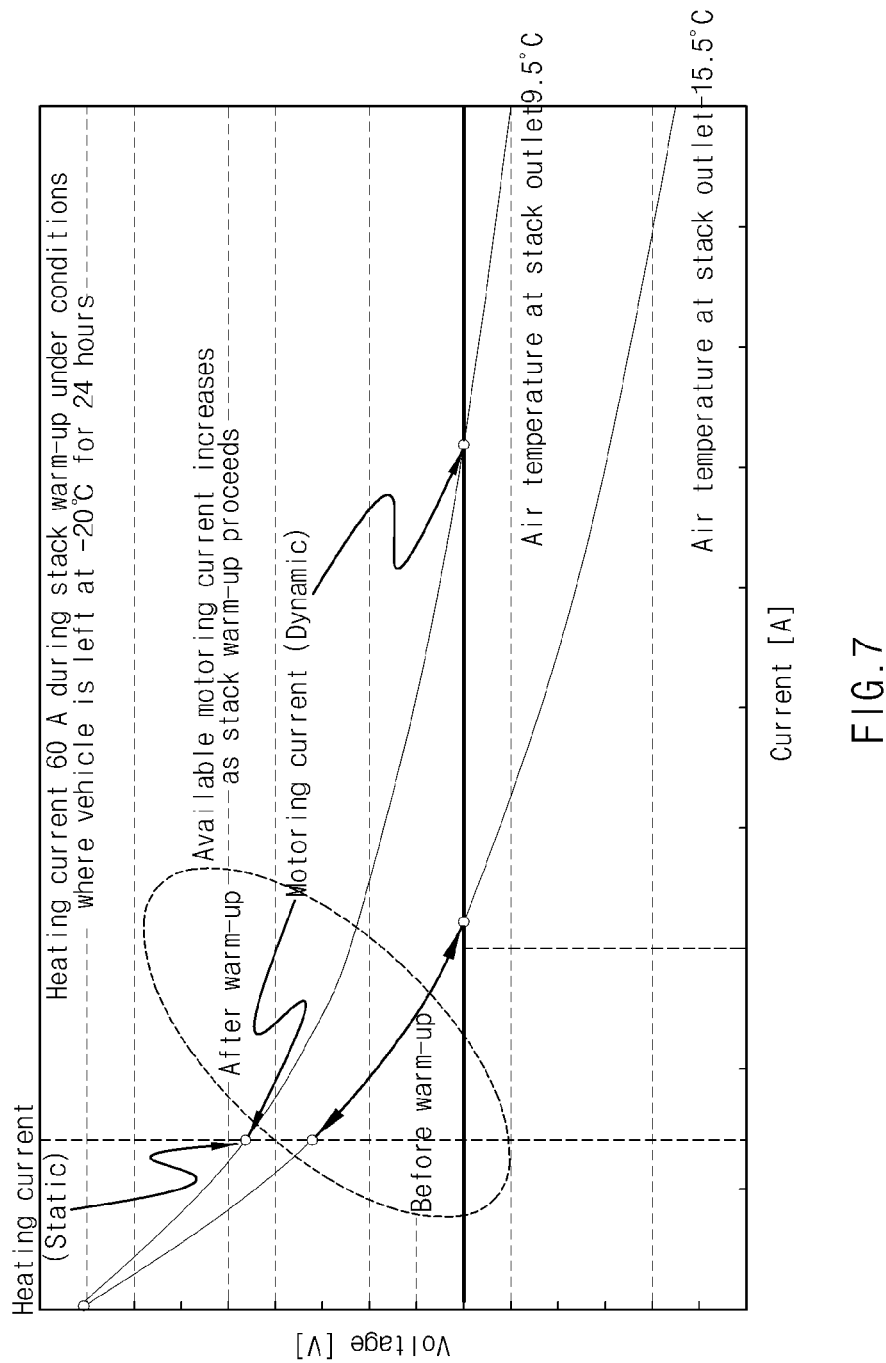
FIG. 7 is a diagram showing that a heating process and a motoring process can be simultaneously performed in accordance with preferred embodiments of the present invention.

According to further exemplary embodiments and as shown in FIG. 7, FIG. 7 is a diagram showing that the heating process and the motoring process can be suitably simultaneously performed under conditions where the vehicle is left at −20° C. for 24 hours, where it can be seen that the available motoring current significantly increases at a temperature after the stack warm-up (9.5° C. at the stack outlet) compared to a temperature before the stack warm-up (−15.5° C.).

Preferably, when a constant heating current is distributed from the stack output current and applied to the heater, the available motoring current gradually increases as the warm-up of the fuel cell stack is performed, that is, as the temperature of the fuel cell stack suitably increases.

Figure 8:
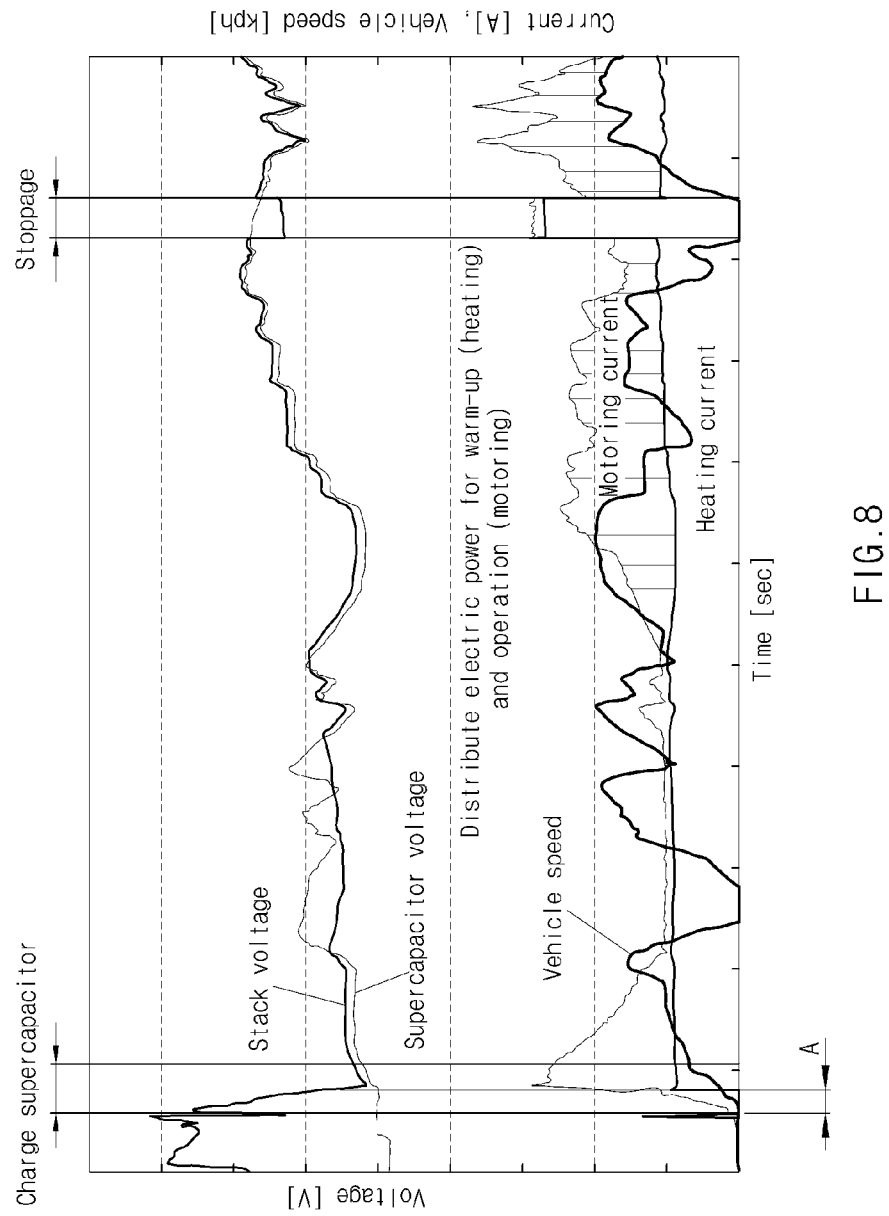
FIG. 8 is a diagram showing an example in which stack power is distributed to warm up a fuel cell stack and to operate a fuel cell vehicle.

According to certain exemplary embodiments and as shown in FIG. 8, FIG. 8 is a diagram showing a preferred example in which the stack power is distributed to warm up the fuel cell stack (heating process) and to operate the fuel cell vehicle (motoring process), from which it can be seen that a substantially constant stack current (heating current) is suitably applied to the heater during the motoring process and is not applied to the heater during the initial period (Period-A) when the supercapacitor is actually charged with the stack voltage and during the period when the vehicle is stopped. During the period when the supercapacitor is charged, the operation of the heater (for warming up the fuel cell stack) is temporarily stopped by cutting off the heating current.

Figure 9:
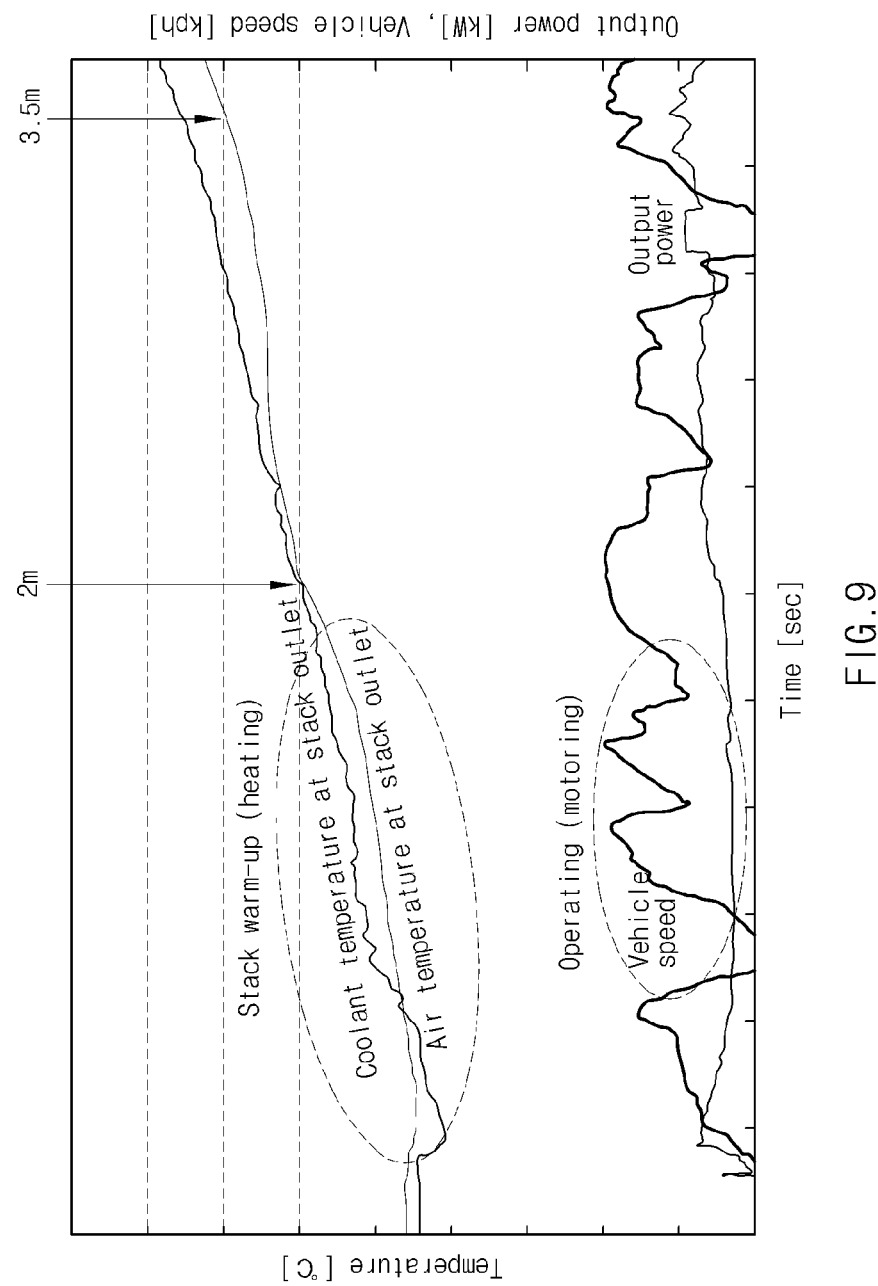
FIG. 9 is a diagram showing that the temperature of coolant and that of a fuel cell stack are raised simultaneously with the operation of a fuel cell vehicle which has been left at sub-zero temperatures for a long time.

According to further exemplary embodiments and as shown in FIG. 9, FIG. 9 is a diagram showing that the temperature of coolant and that of the fuel cell stack are raised simultaneously with the operation of the fuel cell vehicle which has been left at sub-zero temperatures for a long period of time, from which it can be seen that the temperature of coolant is raised simultaneously when the fuel cell vehicle is operated by the motoring process and, as a result, the temperature of the fuel cell stack is raised.

Preferably, when the valves of the fuel cell system are suitably controlled so as not to freeze using the thermoswitch, the valve heater, and the auxiliary battery (low-voltage battery), it is possible to instantly operate the valves during the cold start without the necessity of thawing the valves, and thus it is possible to reduce the cold start time, eliminate the energy required to thaw the valves, and improve the reliability of the cold start.

Accordingly, the valves are suitably prevented from freezing by intermittently heating the valves while the fuel cell is turned off and, accordingly, the thermoswitch for automatically opening and closing a battery power supply circuit according to ambient temperature is preferably provided for the intermittent operation of the heater.

Accordingly, since it is possible to fundamentally prevent the valves of the fuel cell system from freezing at a temperature below the freezing point, it is unnecessary to thaw the valves during the cold start after being left at low temperature, and thus it is possible to suitably eliminate the time and energy required to thaw the valves and improve the cold startability.

Preferably, the valves of the fuel cell system to which the thermoswitch and the heater are applied may include, but are not necessarily limited to, a valve in a passage through which humidified air of the air processing system passes, a hydrogen purge valve, or and a hydrogen recirculation valve installed at a hydrogen outlet of the fuel cell stack, which are exposed to wet conditions during operation of the fuel cell stack.

Figure 10:
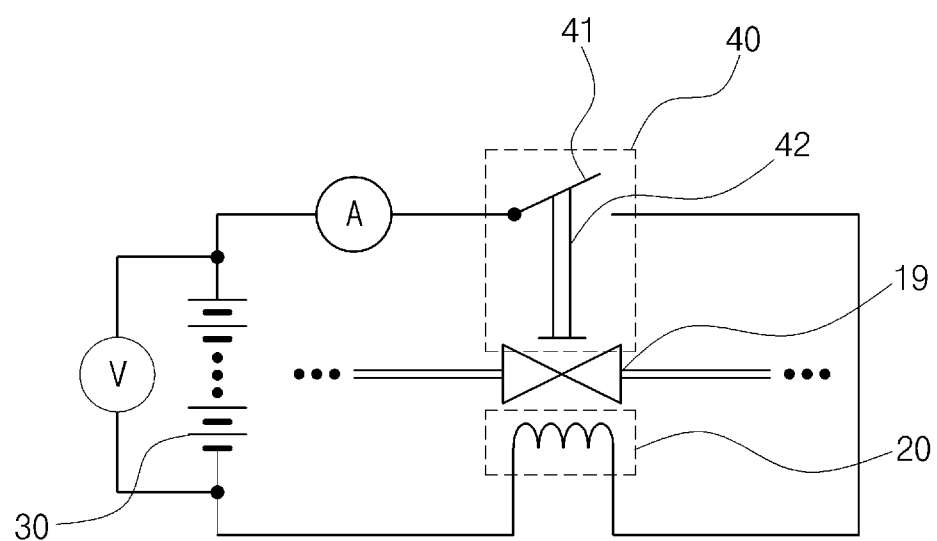
FIG. 10 is a schematic diagram showing a configuration of a valve anti-freezing device including a bimetal switch in accordance with the present invention.

According to further exemplary embodiments and as shown in FIG. 10, FIG. 10 is a schematic diagram showing a preferred configuration of a valve anti-freezing device including a thermoswitch (e.g., bimetal switch) in accordance with preferred embodiments of the present invention. As shown in FIG. 10, the valve anti-freezing device includes a heater 20 for suitably heating a valve 19, a battery 30 as a power source for suitably operating the heater 20, and a thermoswitch 40 installed on a circuit (battery power supply circuit) suitably supplying the electric power of the battery 30 to the heater 20 and automatically opened and closed according to ambient temperature to intermittently supply the electric power of the battery 30 to the heater 20.

Preferably, the heater 20 may be a PTC heater for heating the valve, and the battery 30 may be a low-voltage battery (e.g., 12V auxiliary battery), which is typically mounted on the fuel cell vehicle.

In further preferred embodiments, the thermoswitch 40 of the present invention may be a bimetal switch including a bimetal 42 operated to automatically open and close the battery power supply circuit according to ambient temperature.

As shown in FIG. 10, the bimetal 42 of the bimetal switch 40 is suitably connected to a switch terminal 41 of the battery power supply circuit such that the switch terminal 41 is operated by a change in shape of the bimetal 42 according to ambient temperature, thus automatically opening and closing the battery power supply circuit.

Preferably, since the heater 20 should provide heat directly to the valve 19 during operation, it is closely adhered to the surface of the valve, and also the thermoswitch 40, i.e., the bimetal switch, is closely adhered to the surface of the valve to be operated according to the temperature of the valve surface.

In further preferred embodiments, the bimetal 42 used in the bimetal switch 40 suitably closes the circuit when the temperature of the valve surface is lowered below the freezing point at which the valve may freeze and opens the circuit when the temperature of the valve surface is suitably raised to a predetermined level.

Preferably, the valve anti-freezing device having the above-described configuration can suitably prevent the valve 19 from freezing by automatically supplying and cutting off the battery power to the heater 20 according to the open/close state of the circuit by the bimetal switch 40 when the vehicle is turned off and left at sub-zero temperatures.

Accordingly, when the vehicle is left at suitably low temperature, the temperature of the valve surface is gradually lowered and reaches the freezing point (0° C.) and, at this time, the bimetal switch 40 is closed such that the electric power of the low-voltage battery 30 is supplied to the PTC heater 20. Then, the heat generated from the PTC heater 20 is transmitted to the valve 19, thus raising the temperature of the valve.

Afterwards, when the temperature of the valve surface is raised and reaches a predetermined level (e.g., 5° C.), the bimetal switch 40 is suitably opened such that the electric power of the low-voltage 30 is no longer supplied to the PTC heater 20, thus turning off the PTC heater 20.

Accordingly, in further preferred embodiments, the on/off operation of the heater 20 is intermittently repeated according to the temperature of the valve surface such that the temperature of the valve can be suitably maintained at above-zero temperatures at which the valve will not freeze, thus suitably improving the cold startability.

As a result, since it is possible to maintain the temperature of the valve 19 at a temperature above the freezing point and instantly operate the valve during the cold start, it is possible to suitably eliminate the valve thawing process, significantly reduce the cold start time and energy, and improve the cold startability.

Figure 11:
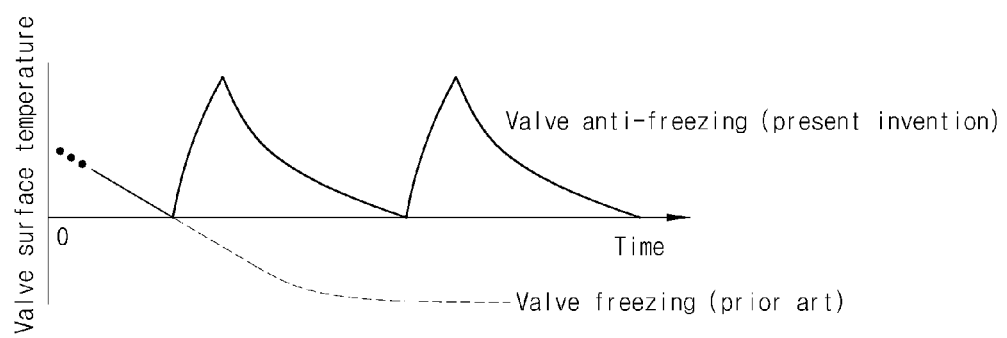
FIG. 11 is a diagram showing a change in temperature of valve surface according to the operation of the valve anti-freezing device in accordance with the present invention.

According to further exemplary embodiments and as shown in FIG. 11, FIG. 11 is a diagram showing a change in temperature of the valve surface according to the operation of the valve anti-freezing device in accordance with the present invention, which was measured by installing a probe for measuring the temperature on the valve surface.

Preferably, as shown in FIG. 11, when the temperature of the valve surface reaches the freezing point at which the valve will freeze, the bimetal switch 40 is suitably closed such that the heater 20 operates to raise the temperature and, when the temperature of the valve surface is raised to a predetermined level, the bimetal switch 40 is suitably opened such that the heater 20 is turned off.

According to further preferred embodiments, afterwards, when the temperature of the valve surface reaches the freezing point again, the heater 20 operates to raise the temperature and, when the temperature of the valve surface is raised again, the heater 20 is turned off.

Preferably, it is possible to prevent the valve from freezing by continuously repeating the above-described operation of the heater 20 when the vehicle is turned off and left at low temperature.

Preferably, since the battery power is used as the heating power in the present invention, the number of operations and the operation time of the heater while the vehicle is turned off are related to the capacity and state of charge (SOC) of the battery and, preferably, the time required to maintain the temperature of the valve above the freezing point may be limited.

Preferably, the reason for this is that the low-voltage battery 30, which is generally mounted on the fuel cell vehicle, suitably boosts the power using a low-voltage DCDC converter (LDC) and provides the boosted power to the BOP components, and thus it is necessary to maintain the SOC of the low-voltage battery above a predetermined level for the cold start of the fuel cell system.

According to preferred embodiments of the present invention, the low-voltage battery (e.g., 12 V 5 AH battery), which is generally mounted on the fuel cell vehicle, can be used for about 3.5 days when the heater is operated intermittently in the vehicle left at −15° C. to the extent that it does not degrade the startability of the LDC boost (see FIG. 12) and the like, which is suitably applicable to an actual vehicle.

Preferably, when the capacity of the battery is increased, it is possible to extend the use time.

Figure 12:
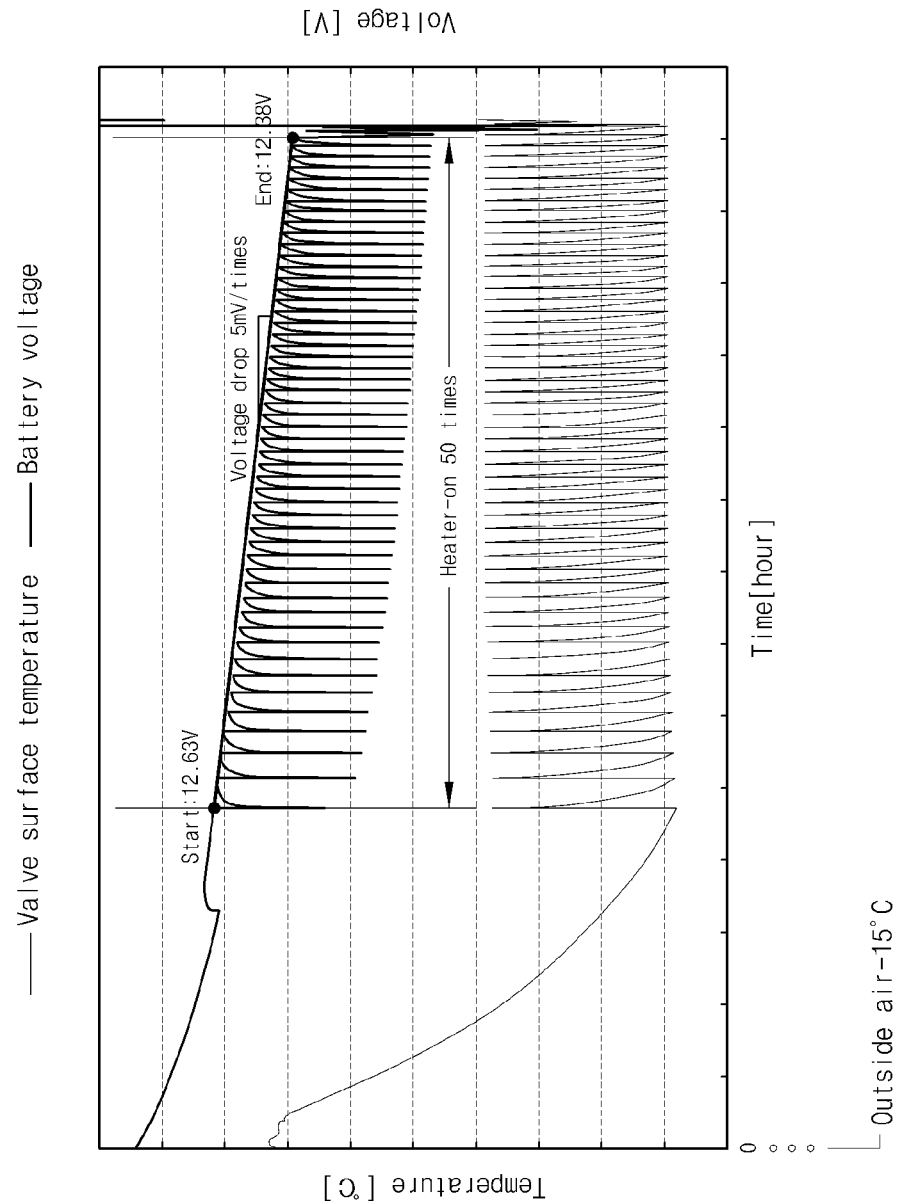
FIG. 12 is a diagram showing a drop in battery voltage according to operation of a heater of the valve anti-freezing device in accordance with preferred embodiments of the present invention.

According to further exemplary embodiments and as shown in FIG. 12, FIG. 12 is a diagram showing a drop in battery voltage according to the operation of the heater of the valve anti-freezing device in accordance with certain preferred embodiments of the present invention, which was experimentally obtained using the 12 V 55 AH battery when the valve anti-freezing device was suitably applied to the hydrogen purge valve in the vehicle left at −15° C. (Heater operated 50 times and voltage dropped 5 mV per once).

Preferably, when the vehicle is not operated for more than a predetermined period of time, the SOC of the low-voltage battery may be lowered to a level where the start-up of the fuel cell becomes impossible by the repeated operations of the heater, and thus the present invention may further provide an element for preventing battery over-discharge.

Figure 13:
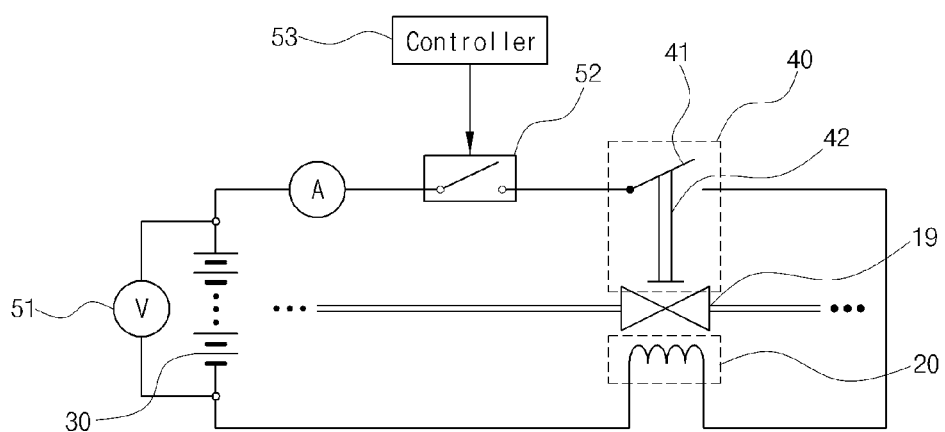
FIG. 13 is a schematic diagram showing an element for preventing battery over-discharge in the valve anti-freezing device in accordance with preferred embodiments of the present invention.

According to further exemplary embodiments and as shown in FIG. 13, FIG. 13 is a schematic diagram showing an exemplary element for preventing battery over-discharge in the valve anti-freezing device in accordance with preferred embodiments of the present invention. Preferably, the element for preventing battery over-discharge may include a voltage detector 51 detecting the voltage of the low-voltage battery 30, which corresponds to the SOC of the battery, a switch 52 installed in the battery power supply circuit, and a controller preferably receiving electric power from the low-voltage battery 30 at all times and turning off the switch 52 when the battery voltage detected by the voltage detector 51 is less than a reference value to cut off the battery power supplied to the heater 20.

In certain preferred embodiments, the switch 52 may be a relay switch or semiconductor switch capable of being suitably opened and closed by an electrical signal of the controller 53.

Preferably, the controller 53 uses the electric power received from the low-voltage battery 30 as a power for operating the switch 52, and the reference value is a predetermined value to prevent the battery voltage from being suitably lowered to a level where the start-up of the fuel cell becomes impossible by the repeated operations of the heater.

Accordingly, in further preferred embodiments, as a result, when the voltage of the low-voltage battery 30 is suitably less than the reference value even though the vehicle is turned off, the controller 53 suitably turns off the switch 52 using the electric power of the low-voltage battery 30 as the driving power and suitably opens the battery power supply circuit to prevent the battery from being discharged and, at the same time, to prohibit the operation of the heater 20.

With the element for preventing battery over-discharge, it is possible to suitably prevent the low-voltage battery from being over-discharged by the operation of the heater, thus suitably preventing the fuel cell from not being started.

As described herein, the present invention preferably provides the following effects.

Accordingly, since the heating process for warming up the fuel cell stack and the heating process for operating the fuel cell vehicle are preferably simultaneously performed after supplying reactant gases for generating electricity to the fuel cell stack, it is possible to more rapidly and efficiently cold start the fuel cell vehicle.

Accordingly, since the BOP valves of the fuel cell system are intermittently heated by the heater such that the valves are prevented from freezing while the vehicle is turned off and left at low temperature, it is possible to suitably eliminate the process of thawing the valves during the cold start, and thus it is possible to suitably reduce the cold start time and energy and suitably improve the cold startability.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for cold starting a fuel cell vehicle, the method comprising:
supplying reactant gases to a fuel cell stack to generate a stack current; and
simultaneously performing a motoring process to operate the fuel cell vehicle by applying a portion of the stack current generated in the fuel cell stack to a drive motor and performing a heating process to warm up the fuel cell stack by applying any remaining available stack current to a heater for heating coolant,
wherein the fuel cell stack, the drive motor and the heater are all connected electrically in parallel,
wherein the method further comprises preventing valves of a fuel cell system from freezing by applying a valve heater while the fuel cell is turned off before the cold starting, such that the valves of the fuel cell system are immediately opened,
wherein the performing of the motoring process and the performing of the heating process to warm up the fuel cell stack are performed simultaneously when cold starting the fuel cell vehicle.

2. The method of claim 1, wherein when distributing the stack current to simultaneously perform the motoring and heating processes, the stack current applied to the heater is smaller than that applied to the drive motor.

3. The method of claim 2, wherein the stack current is applied only to a predetermined coil heating element among a plurality of coil heating elements which constitute the heater such that only the coil heating element which receives the stack current is operated to heat the coolant.

4. The method of claim 1, wherein a constant stack current is distributed to the heater to perform the heating process during start-up of the vehicle.

5. The method of claim 1, wherein while a fuel cell is turned off, the valves of the fuel cell system are intermittently heated by the valve heater receiving electric power from a battery mounted on the fuel cell vehicle and a thermoswitch installed on a battery power supply circuit connected to the valve heater and automatically opening and closing the battery power supply circuit according to ambient temperature, thus preventing the valve from freezing before the cold start.

6. The method of claim 5, wherein the thermoswitch is a bimetal switch equipped with a bimetal operated to automatically open and close the battery power supply circuit according to ambient temperature.

7. The method of claim 5, wherein battery power supplied to the heater is cut off by a controller of an element for preventing battery over-discharge, which turns off the switch of the battery power supply circuit when the battery voltage detected by a voltage detector of the element for preventing battery over-discharge is less than a reference value.

8. The method of claim 5, wherein the valve of a fuel cell system is a valve in a passage through which humidified air of an air processing system passes, a hydrogen purge valve installed at a hydrogen outlet of the fuel cell stack, or a hydrogen recirculation valve.

9. The method of claim 1, wherein, during the cold starting of the fuel cell stack, an available motoring current of the stack current applied to the drive motor gradually increases as a temperature of the fuel cell stack increases by the warming up of the fuel cell stack.

10. A method for cold starting a fuel cell vehicle, the method comprising:
supplying reactant gases to a fuel cell stack to generate a stack current; and
simultaneously performing a motoring process for operating the fuel cell vehicle and a heating process by applying a portion of the stack current from previously generated by the fuel cell stack to a heater to heat coolant supplied to the fuel stack,
wherein the fuel cell stack, a drive motor and the heater are all connected electrically in parallel,
wherein the method further comprises preventing valves of a fuel cell system from freezing by applying a valve heater while the fuel cell is turned off before the cold starting, such that the valves of the fuel cell system are immediately opened,
wherein the performing of the motoring process and the performing of the heating process to warm up the fuel cell stack are performed simultaneously when cold starting the fuel cell vehicle.

11. The method for cold starting a fuel cell vehicle of claim 10, wherein the motoring process for operating the fuel cell vehicle is performed by applying a portion of the stack current generated in the fuel cell stack to the drive motor.

12. The method for cold starting a fuel cell vehicle of claim 10, wherein the heating process for warming up the fuel cell stack is performed by applying the remaining available stack current to the heater for heating coolant.

13. The method of claim 10, wherein, during the cold starting of the fuel cell stack, an available motoring current of the stack current applied to the drive motor gradually increases as a temperature of the fuel cell stack increases by the warming up of the fuel cell stack.

* * * * *